Oct. 17, 1950  W. C. DAVIS ET AL  2,526,202
CREASING DEVICE
Filed March 8, 1946  2 Sheets-Sheet 1
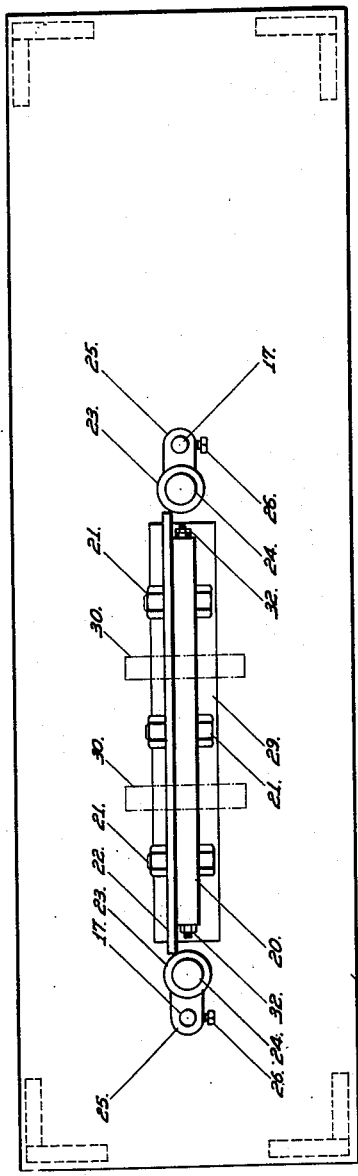
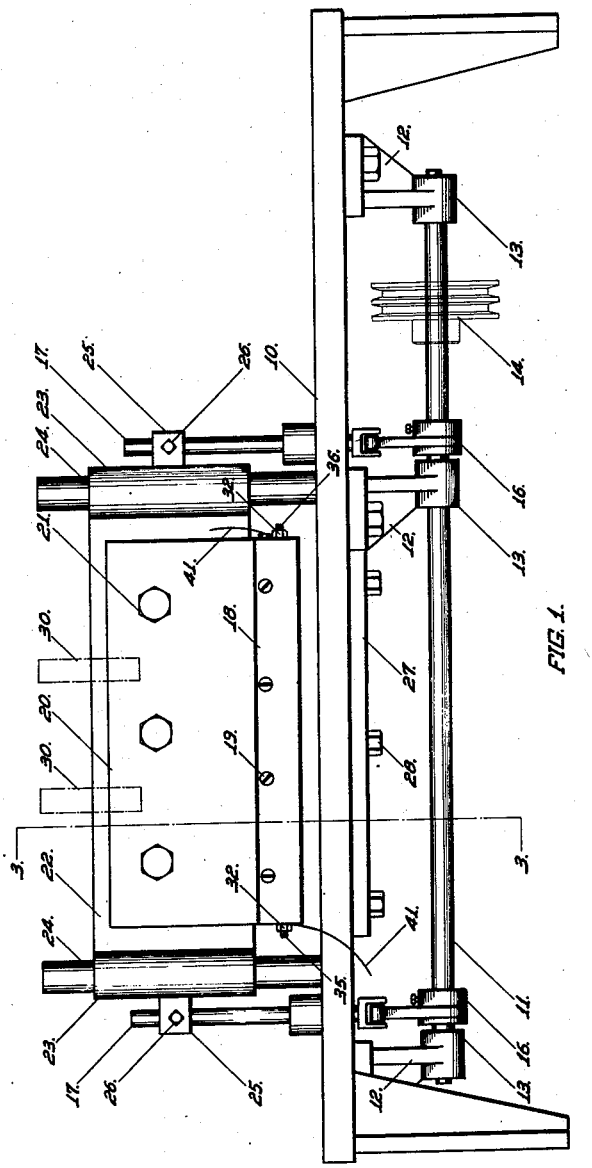
INVENTORS
WILLIAM C. DAVIS.
BY WALLACE H. WOODROW.
Reuben Schmidt
ATTORNEY Oct. 17, 1950 W. C. DAVIS ET AL 2,526,202
CREASING DEVICE
Filed March 8, 1946 2 Sheets-Sheet 2
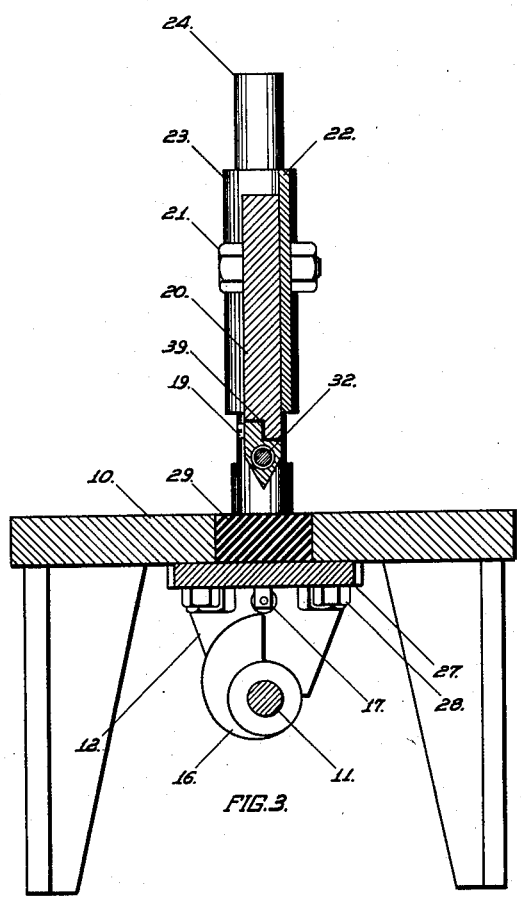
FIG. 3.
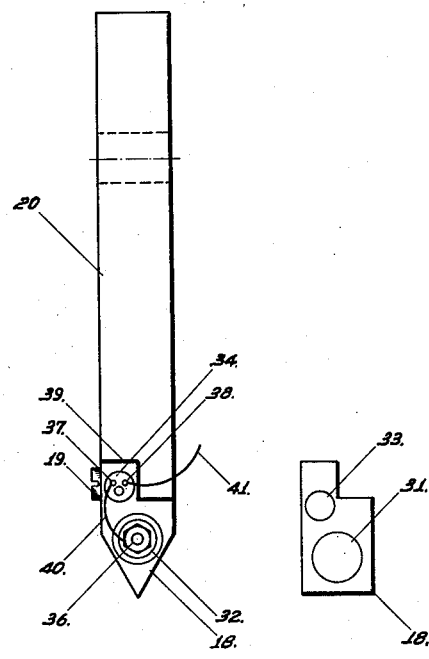
FIG. 4. FIG. 5.
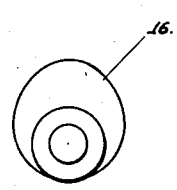 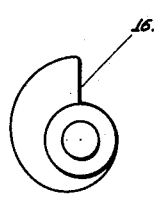 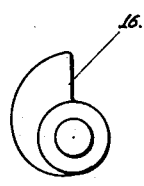 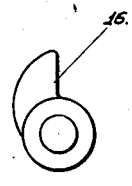
FIG. 6. FIG. 7. FIG. 8. FIG. 9.
INVENTORS
WILLIAM C. DAVIS
BY WALLACE H. WOODROW.
Reuben Schmidt
ATTORNEY Patented Oct. 17, 1950

2,526,202

UNITED STATES PATENT OFFICE 2,526,202

CREASING DEVICE

William C. Davis, New Canaan, Conn., and Wallace H. Woodrow, Wilbraham, Mass., assignors to Monsanto Chemical Company, St. Louis, Mo., a corporation of Delaware Application March 8, 1946, Serial No. 652,838

1 Claim. (Cl. 73—15.6)

This invention relates to an apparatus for creasing sheets of plastic material. More particularly, this invention relates to an apparatus for testing the ability of plastic materials to withstand creasing operations without failure.

It is an object of this invention to provide apparatus for creasing plastic materials. A further object is to provide apparatus for testing the creasing properties of plastic materials.

These and other objects are accomplished according to the invention described hereinafter with reference to a device presenting one embodiment of the invention and illustrated in the accompanying drawings.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed in the description is for the purpose of description and not of limitation.

In the drawings:

Fig. 1 is a side elevational view of a creasing device constructed in accordance with this invention.

Fig. 2 is a top plan view of the same.

Fig. 3 is a sectional view taken on line 3—3 of Fig. 1.

Fig. 4 is an enlarged end elevational view of a creasing blade attached to the holder therefor, after insertion of the heater and thermostat.

Fig. 5 is an enlarged end elevational view of a bar blade for creasing the plastic through an angle of 180°.

Figs. 6–9 are enlarged side elevational views of four types of cams.

The apparatus illustrated in the accompanying drawings comprises a table or base 10 from which is suspended a drive shaft 11 by means of hangers 12 having bearings 13 in which the drive shaft 11 turns. Pulleys 14 mounted on drive shaft 11 are connected by means of belts (not shown) to a source of power (not shown) which may be an electric motor in combination with a reduction gear unit.

On drive shaft 11 are mounted cams 16 which, acting through cam followers 17, impart a reciprocating action to creasing blade 18. Creasing blade 18 is attached by means of screws 19 to holding plate 20 which, in turn, is fastened to guide plate 22 by cap screws 21.

Guide plate 22 is welded, or otherwise firmly secured, to babbited bushings 23 which slide on guide posts 24. Attached to bushings 23 are arms 25 through which pass cam followers 17. The positions of guide plate 22 and cam followers 17 relative to each other is maintained by set screws 26.

Attached to the table or base 10 by screws 28 is a plate 27 which covers a rectangular opening in the table. In the recess formed by the opening in the table covered from beneath, a slab of backing material 29 is placed which may vary from a solid steel bar to a soft resilient material such as sponge rubber, depending on the shape of the particular blade in use and the type of crease desired. As shown in Fig. 3, slab 29 is of sponge rubber.

When it is desired to increase the force of creasing blade 18, weights 30 (shown in dotted lines) may be mounted on guide plate 22. These weights may be of varying number and size depending on the load desired.

Creasing blade 18 has longitudinal passage 31 drilled therein to receive a tubular heater 32 and recess 33 to receive thermostat 34. The heater has terminals 35 and 36 and the thermostat has terminals 37 and 38. Creasing blade 18 is separated from blade holder 20 by insulating material 39 which may be sheet asbestos or the like.

The heater terminal 36 and thermostat terminal 37 are connected together in series by insulated wire 40 shown in detail in Fig. 4. Heater terminal 35 and thermostat terminal 38 are connected to a suitable source of current by means of lead-in wires 41. In order to provide for a more even temperature in the creasing blade, an auto-transformer (not shown) is preferably inserted between the heater and the source of current.

In the operation of the apparatus illustrated in the accompanying drawings, a creasing blade 18 having a surface of the desired configuration is mounted on the blade holder 20 and the source of electrical current for heating the blade connected to lead-in wires 41. Weights 30 sufficient in number and size to give the desired load are placed on guide plate 22. Cams 16 of such configuration as to give the desired rate of application of the load and dwell time of the load on the plastic are mounted on drive shaft 11. A sheet of plastic material to be creased is placed beneath the creasing blade holder 20 upon an appropriate backing material 29, the creasing blade holder being in a raised position.

The proper cams, load and type of creasing blade having been installed, the creasing blade brought to the desired temperature, and the cams positioned on the upward stroke, the motor or other source of driving power for the drive shaft is started. This causes the driving shaft 11 to turn and operating through the cam 16 and cam follower 17 causes the creasing blade 18 to rise and fall in successive cycles. The blade on the down stroke creases the plastic sheet which may be shifted thereafter during the upward stroke of the blade, either by hand or automatically by a suitable device, (not shown), to a new position to crease a fresh portion of the plastic on the next downward stroke of the blade.

In creasing plastic sheets through an angle less than 180° by means of the apparatus of the invention, the plastic sheet is placed flat beneath the creasing blade on a soft resilient backing material of sponge rubber or the like. The creasing blade is so constructed that the sides of the blade are at the desired angle to each other, e. g. 60°, and the forward edge is somewhat blunted so as not to cut the plastic.

In creasing plastic sheets through an angle of 180°, the backing material comprises a bar of a hard material such as a steel bar having a flat pressing surface. The plastic sheet is looped back on itself to present a wide loop beneath the blade.

As pointed out above, cams of varying configuration may be used to vary the rate of application of the load. Thus, a cam of the type illustrated by Fig. 6 is used when a moderate rate of load application is desired. When the rate of application of load resulting from a free fall is desired, a cam of the type illustrated in Fig. 7 is used. Cams having configurations resulting in a free fall, but long dwell periods on the plastic are illustrated in Figs. 8 and 9.

In addition to the use of the device of the invention for testing the creasing properties of plastic materials, it is also admirably adapted for the manufacture of creased articles, such as lampshade material. By virtue of the combination of means for controlling the temperature of the creasing blade, the load, the rate of application of the load and the dwell time of the creasing blade on the plastic, it is possible to impart a desired crease or fold on a wide variety of plastic materials without injury thereto.

In certain cases it may be desirable to apply a stream of cold air to the plastic immediately after removal of the creasing blade to cool the plastic and set the crease, particularly when a high temperature creasing blade is required.

The device of the invention may be used to crease sheets made from various types of plastic material, for example, those made from cellulose derivatives such as cellulose acetate, cellulose nitrate, cellulose aceto-butyrate, ethyl cellulose; vinyl resins such as polyvinyl chloride, vinyl chloride-vinyl acetate and similar copolymers, vinyl chloride-methyl acrylate copolymers, esters of acrylic and methacrylic acid and the like.

Sheets of different thicknesses may be creased with the device of the invention, for example, sheets having a thickness of as little as 0.002–0.005 inch up to 0.01 inch or more with suitable adjustment of the load, temperature, etc.

It is to be understood that the description of this invention is illustrative thereof and that variations may be made within the scope of the invention as defined in the appended claim.

What is claimed is:

In a creasing device for plastic materials, in combination, a base, a drive shaft suspended from said base, cams mounted on said shaft and spaced inwardly from each extremity of said shaft, cam followers in contact with said cams, extension members attached to said cam followers and passing through said base, arms adjustably attachable to said extension members above said base, a guide plate, bushings attached to and intermediate said arms and said guide plate, posts attached at right angles to said base and passing through said bushings, a blade mounted on said plate so that the edge of said blade is directed at right angles to said base, detachable weights on said plate to control the force of said blade, an electrical heater and thermostat having leads for connection to a source of electrical current within said blade and a backing material on said base for supporting the plastic and receiving the action of said blade.

WILLIAM C. DAVIS.
WALLACE H. WOODROW.

REFERENCES CITED

The following references are of record in the file of this patent:

UNITED STATES PATENTS

| Number | Name | Date |
|---|---|---|
| 161,737 | Beardslee | Apr. 6, 1875 |
| 914,816 | Dunton | Mar. 9, 1909 |
| 1,013,832 | Allen | Jan. 3, 1912 |
| 1,429,481 | Ayers, Jr. | Sept. 16, 1922 |
| 1,604,141 | Amsler | Oct. 26, 1926 |
| 1,646,195 | German | Oct. 18, 1927 |
| 2,045,548 | Dillon et al. | June 23, 1936 |
| 2,396,620 | Taxwood | Mar. 12, 1946 |